United States Patent [19]
Reed

[11] Patent Number: 5,151,235
[45] Date of Patent: Sep. 29, 1992

[54] PROCESS OF MAKING PHENYLENE SULFIDE/BIPHENYLENE SULFIDE COPOLYMER PIPE

[75] Inventor: Jerry O. Reed, Bartlesville, Okla.

[73] Assignee: Phillips Petroleum Company, Bartlesville, Okla.

[21] Appl. No.: 556,685

[22] Filed: Jul. 23, 1990

[51] Int. Cl.$^5$ .................. B29C 55/22; B29C 55/26
[52] U.S. Cl. ..................... 264/209.5; 264/209.7; 264/211.12; 264/290.2; 264/331.11; 525/535; 525/537
[58] Field of Search ............ 264/141, 209.1, 209.3, 264/209.4, 209.5, 209.7, 210.1, 210.7, 211.12, 211.13, 288.4, 290.2, 331.11, 331.12; 428/36.9, 419, 910; 525/535, 537; 528/388

[56] References Cited

U.S. PATENT DOCUMENTS

| | | | |
|---|---|---|---|
| 3,354,129 | 11/1967 | Edmonds, Jr. et al. | 528/388 X |
| 3,966,688 | 6/1976 | Campbell | 525/537 |
| 4,274,993 | 6/1981 | Narisawa et al. | 525/537 X |
| 4,775,571 | 10/1988 | Mizuno et al. | 428/419 X |

FOREIGN PATENT DOCUMENTS 222199   5/1987   European Pat. Off. ......... 264/209.4

Primary Examiner—Leo B. Tentoni
Attorney, Agent, or Firm—David L. Kinsinger

[57] ABSTRACT

An improved pipe is produced from phenylene sulfide/biphenylene sulfide copolymers. The improved pipe has greater flexibility and ductility than pipe produced from normal PPS resin. Such pipe is produced by preparing a phenylene sulfide/biphenylene sulfide copolymer and forming the copolymer into essentially amorphous pipe by extrusion followed by rapid and uniform quench to avoid pipe crystallization. Such amorphous pipe also can be oriented by subsequent die extrusion.

19 Claims, 2 Drawing Sheets

PROCESS OF MAKING PHENYLENE SULFIDE/BIPHENYLENE SULFIDE COPOLYMER PIPE

BACKGROUND OF THE INVENTION

This invention relates to a phenylene sulfide (PS)/biphenylene sulfide (BPS) copolymer and the production thereof. In another aspect, it relates to an amorphous pipe.

The use of poly(phenylene sulfide) resins, hereinafter sometimes referred to as PPS resin, to produce pipe is known; however, normal PPS resin yields pipe that is crystalline and brittle. For commercial use, a non-brittle pipe that is more flexible and ductile is needed.

SUMMARY OF THE INVENTION

It is the object of this invention to produce a pipe from PPS resin that is non-brittle and is more flexible and ductile than pipe produced from normal PPS resin.

It is a further object of this invention to produce an amorphous PPS pipe.

A further object is to produce a pipe which is flexible after orienting.

In accordance with this invention there is provided a pipe comprised of phenylene sulfide/biphenylene sulfide copolymer. In accordance with another aspect of this invention, an amorphous pipe comprised of PS/BPS copolymer is oriented by die extrusion to produce a an oriented pipe that is flexible.

DETAILED DESCRIPTION OF THE INVENTION

Figure 1:
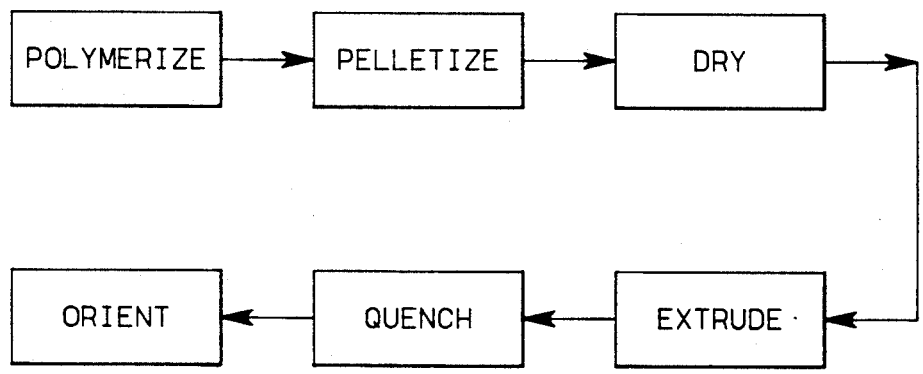
FIG. 1 is a schematic diagram showing a preferred process for the production of pipe using a PS/BPS copolymer.

The PS/BPS copolymer may be produced by the conventional methods. The copolymerization can be carried out as broadly disclosed in Campbell, U.S. Pat. No. 3,919,177 and Edmonds and Scoggins, U.S. Pat. No. 4,116,947, the disclosures of which are hereby incorporated of reference.

For example, a phenylene sulfide/biphenylene sulfide copolymer is prepared by, first, mixing at least one suitable source of sulfur with at least one alkali metal carboxylate and at least one organic amide. With suitable sulfur sources other than alkali metal sulfides and alkali metal bisulfides, at least one base is also required. Also, it is preferable to use a base when the alkali metal bisulfides are employed as sulfur sources. Next, the mixture is heated, dehydrated, and then combined with two or more halogenated aromatics for the polymerization.

In accordance with a highly preferred method of making the phenylene sulfide/biphenylene sulfide copolymers, an aqueous sodium hydroxide solution is first mixed with an aqueous sodium bisulfide (NaSH) solution, sodium acetate, and N-methyl-2-pyrrolidone (NMP). Next, the mixture is heated, dehydrated, and then combined with para-dichlorobenzene (p-DCB), 1,2,4-trichlorobenzene (TCB), and 4,4'-dibromobiphenyl.

Generally, the amount of 4,4'-dibromobiphenyl used in the polymerization is in the range of 1 to 15 mole percent (based on the p-DCB and 4,4'-dibromobiphenyl charge). Preferably, this amount is in the range of 3 to 10 mole percent, and more preferably, this amount is about 4 to 8 mole percent.

Generally, the amount of 1,2,4-trichlorobenzene used in the polymerization is in the range of 0.05–0.8 mole percent (based on the p-DCB and 4,4'-dibromobiphenyl charge). Preferably, this amount is in the range of 0.1–0.6 mole percent, and more preferably, this amount is in the range of 0.2 to 0.4 mole percent.

The temperature at which the polymerization can be conducted can vary over a wide range and will generally be within the range of from about 230° C. to about 450° C. The reaction time will be within the range of from about 10 minutes to about 3 days and preferably about 1 hour to about 8 hours. The pressure need be only sufficient to maintain the halogenated aromatics and the organic amide substantially in the liquid phase, and to retain the sulfur source therein. Preferably, the polymerization mixture is heated to about 230° C. and held for about 2 hours and then heated to about 265° C. and held for about 3 hours.

The phenylene sulfide/biphenylene sulfide copolymer produced for use in this invention can be separated from the reaction mixture by conventional procedures, for example, by filtration of the polymer followed by washing with water, or by dilution of the reaction mixture with water, followed by filtration and water washing of the polymer. Preferably, deionized water is added to the reactor at the end of the polymerization time and the contents are cooled to about 100° C. and filtered. The polymers are then slurried with ambient deionized water, filtered, slurried twice with hot (175° C.) deionized water and dried.

The copolymers produced for use in this invention will have melt viscosities, as measured as melt flows according to ASTM D-1238 at 316° C. with a 5 kg weight, suitable for extruding amorphous pipe. In general, suitable melt flows will be between about 10 and about 100 g/10 min., preferably between 30 and 70 g/10 min.

The resulting polymers are then prepared to be extruded into pipe. Preferably, the resulting polymers are pelletized using any extrusion equipment capable of reaching extrusion temperatures, then dried before being extruded into pipe. Generally, the pelletization is performed using extrusion equipment with a die temperature in the range of from about 280° C. to about 340° C. Preferably, the die temperature is in the range of from about 300° C. to about 320° C. Generally, the pellets are dried at about 150° C. for about 2 hours before being extruded into pipe.

In accordance with this invention, the PS/BPS copolymer is extruded into pipe. It is essential that the profile being formed be nearly cylindrical and preferably essentially cylindrical.

Generally, the PS/BPS copolymers are extruded into pipe using any extruders, dies, quenching equipment, and takeoffs suitable for producing the amorphous pipe product of this invention. This equipment should be capable of reaching extrusion temperatures in the range of from about 280° C. to about 340° C. and capable of rapid and uniform quench of the extruded pipe to avoid polymer crystallization. Preferably, the equipment is capable of reaching extrusion temperatures in the range of from about 300° C. to about 310° C. Generally, the pipe is quenched by either water spray from around the die opening or by means of a water bath. Preferably, quenching is done by extruding hot pipe directly from the pipe die into a water bath containing cool water. The pulloff rate speed will vary widely depending on the equipment used, pipe diameter, and wall thickness desired. This rate can be between 25 cm/min to 100 cm/min or higher. The pipe wall thickness can vary depending on ability of the quench system to cool the pipe to prevent crystallization and on the desired final oriented pipe wall thickness. In general, the amorphous pipe wall thickness will be about 2 mm to about 6 mm. A pipe outside diameter will be selected based on available pipe die sizes, die extrusion sizes, and the requirements for the oriented pipe.

After extrusion, the pipe of the present invention is essentially amorphous. The density of the pipe is preferably in the range of from about 1.30 g/cc to about 1.32 g/cc. More preferably, the density is about 1.31–1.32 g/cc. For many utilities, additives such as carbon black, antioxidants, u.v. stabilizers or pigments may be present at levels which may effect the density of the pipe while not deletariously affecting pipe formation or orientation.

In one embodiment of the invention, the amorphous pipe is then molecularly oriented. By "molecular orientation" is meant a preferred arrangement of certain axis or planes of molecules with respect to a given axis or plane. This molecular orientation can result in vastly altered strength, elongation, modulus, impact, and other values.

In one embodiment of the invention, the amorphous pipe is oriented by subsequent die extrusion. This subsequent die extrusion is performed by any die extrusion equipment capable of drawing or stretching the polymer uniaxially or biaxially at elevated temperatures.

Of course, all extrusion broadly involves a die, including the formation of the pipe precursor for the oriented PS/BPS copolymer pipe of this invention. By "die extrusion" is meant a subsequent die shaping in which the copolymer pipe at orientation temperature is stretched radially and/or longitudinally and is distinguished from the general term "extrusion". Preferably, it is simultaneously stretched both radially and longitudinally to give biaxial orientation.

By "orientation temperature" is meant that temperature, on reheating, at which the amorphous pipe will orient. Generally, this temperature is around or above the glass transition temperature (Tg).

Preferably, the die extrusion equipment is operated at temperatures in the range of from about 80° C. to about 115° C. More preferably, the die extrusion temperature is in the range of from about 85° C. to about 110° C.

Generally, the takeoff rate for the die extrusion equipment is in the range of from about 0.1 cm/minute to about 100 cm/minute. Preferably, the takeoff rate is in the range of from about 0.5 cm/minute to about 50 cm/minute. Generally, the draw ratios in the longitudinal or machine direction are in the range of from about 1.5× to about 8×. Preferably, they are in the range of from about 2× to about 7×. Generally, the draw ratios in the hoop or transverse directions are in the range of from about 1.5× to about 4×. Preferably, they are in the range of from about 2× to about 3×. Preferably, no significant amount of crystallization occurs during this die extrusion process.

Although the wall thickness of the oriented copolymer pipe of this invention will vary widely depending on the wall thickness of the starting amorphous pipe and on the draw ratios chosen for the orientation, they will generally be from about 0.1 to about 3 mm, preferably 0.2 to 2 mm.

FIG. 1 is a schematic diagram of a preferred process for the production of PS/BPS copolymer pipe. First, PS/BPS copolymers are produced by any conventional method. Second, the resulting copolymers are pelletized using any extrusion equipment capable of reaching extrusion temperatures, then dried. Third, the copolymer pellets are extruded into pipe using any extrusion equipment capable of reaching extrusion temperatures. Fourth, the pipe is quenched by any method capable of rapid and uniform quench to avoid pipe crystallization. Finally, the resulting amorphous pipe is oriented by subsequent die extrusion.

Figure 2:
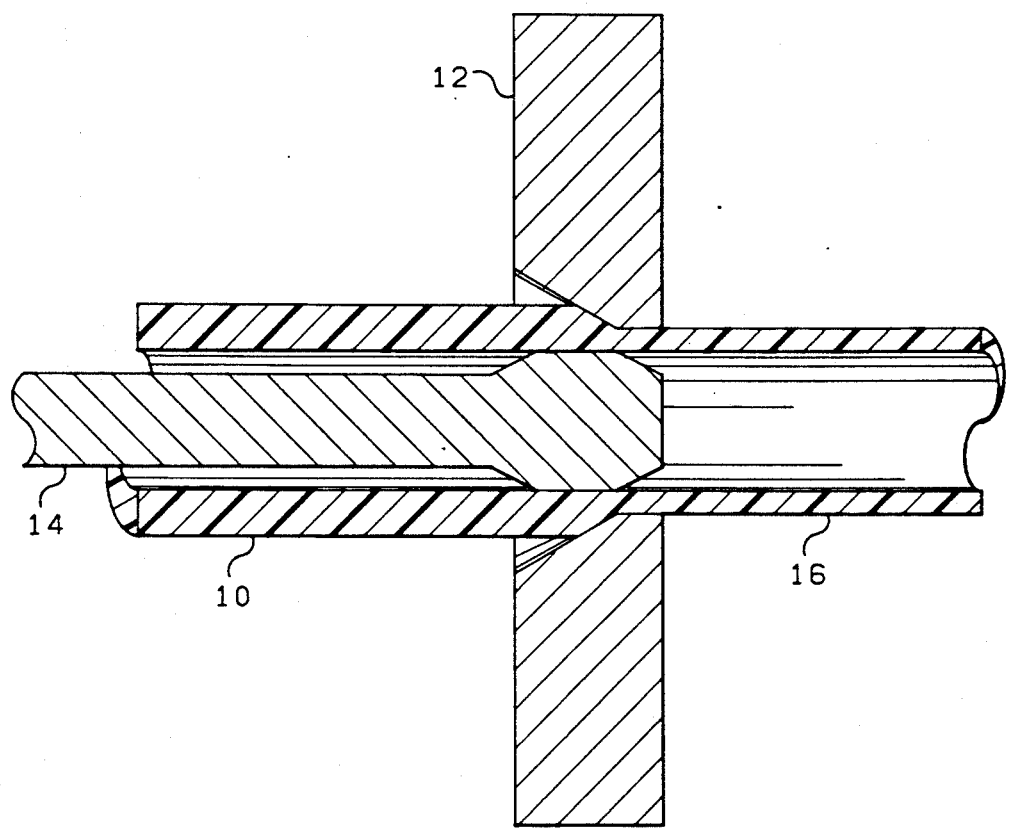
FIG. 2 is a longitudinal cross sectional view of a die extrusion apparatus that can be used to uniaxially orient pipe.

FIG. 2 is cross-sectional drawing of a die extrusion apparatus capable of drawing or stretching a polymer uniaxially at elevated temperatures. In a preferred embodiment of this invention, an essentially amorphous pipe comprising PS/BPS copolymer 10 is passed between a heated die 12 and a mandrel 14 to produce a die drawn (oriented) pipe 16. The resulting die drawn pipe 16 is stretched and thus molecularly oriented in the longitudinal or machine direction.

Figure 3:
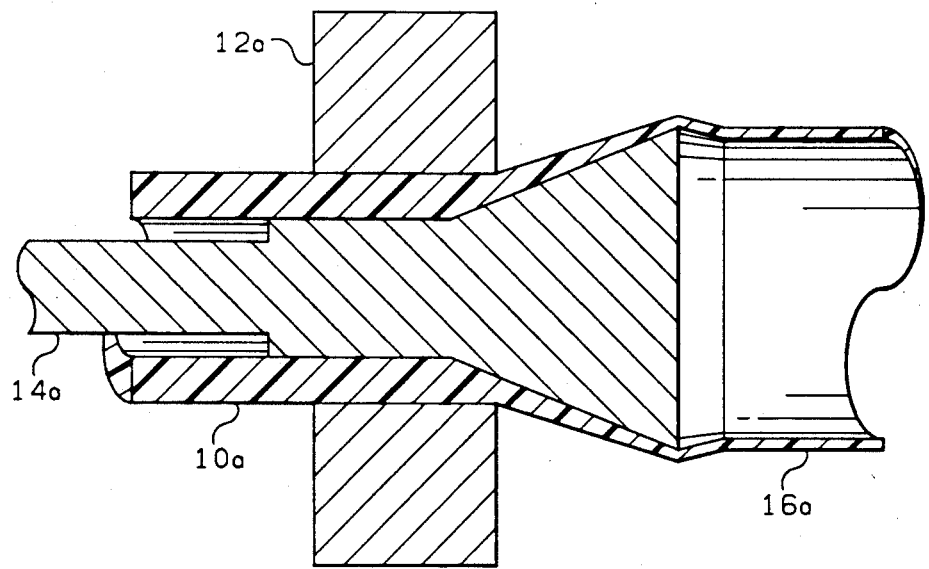
FIG. 3 is a longitudinal cross sectional view of a die extrusion apparatus that can be used to biaxially orient pipe.

FIG. 3 is a sectional drawing of a die extrusion apparatus capable of drawing or stretching a polymer biaxially at elevated temperatures to give a molecularly biaxially oriented pipe. In a preferred embodiment of this invention, an essentially amorphous pipe comprising PS/BPS copolymer 10A is passed between a heated die 12A and a mandrel 14A to produce a die drawn (oriented) pipe 16A. The resulting die drawn pipe 16A is stretched in the longitudinal or machine direction and also in the hoop or transverse direction.

The amorphous copolymer pipe of this invention is translucent and non-brittle. It can be used for transporting chemicals and slurries at moderate temperatures (below the crystallization temperatures) where good chemical resistance is needed and where it is useful to be able to observe the flow of materials to locate flow problems or plugs. The oriented pipe is flexible and can be used as a non-flammable, insulating wrapper or support for electrical wiring. It can be slit after orientation and opened to form an oriented film for use in electrical and electronic applications.

The following examples are provided to further illustrate the invention and are not to be considered as unduly limiting the scope of this invention.

EXAMPLES

In the following examples, melt flow (MF) values were determined by the method of ASTM D-1238, condition 316° C./5 kg modified to use a 5 minute preheat, the value of the polymer melt flow being expressed as g/10 min. Density values were determined with a gradient density column and are expressed as g/cc. Annealed samples for density determination were prepared by breaking a small piece of the pipe (including the entire cross-section) and annealing it in a forced air oven at 200° C. for 15 minutes. Differential scanning calorimetry (DSC) values of glass transition temperature (Tg) and crystalline melting point (Tm) peak were determined from premelted and quenched samples on a Perkin-Elmer DSC-2C differential scanning calorimeter equipped with a data station.

Pipe samples were cut to the desired length and tested as prepared or annealed at 200° C. for 30 minutes in a forced air oven. Quick burst pressure values in psig were determined on 48 cm long pipe samples plugged at both ends by increasing the internal pipe pressure until pipe failure occurred or until the maximum pressure (about 1500 psi) of the testing unit was reached.

Physical properties of die extruded pipes were determined by cutting dogbone shaped specimens in both the longitudinal and transverse directions and testing them on an Instron Tensile Tester.

4,4'-Dibromobiphenyl monomer, purchased from American Hoechst Corp., was 98.5% pure and the remainder of the monomer was monobromobiphenyl. Meta-dichlorobenzene (meta-DCB) was purchased from Standard Chlorine Chemical Co., Inc. and contained 42.8 wt. % meta-DCB, 47.2 wt. % para-DCB, and 7.7 wt. % ortho-DCB.

Die extrusions of the pipe samples were carried out on a presently preferred embodiment of die extrusion apparatus as shown in FIG. 3. The die extrusion apparatus comprised an electrically heated die 12A with the same die diameter as the pipe 10A. A mandrel 14A was supported inside the pipe 10A and increased in diameter downstream of and immediately after the die diameter. The longitudinal (machine) draw was controlled by the speed at which the oriented pipe 16A was pulled from the die 12A. The transverse (hoop) draw was controlled by the diameter of the mandrel 14A after the die 12A. A heated chamber surrounded the die extrusion apparatus. Pipe die extrusion was started by shaping the pipe end to the mandrel size in a heated oil bath. The pipe was pulled at slow speed through the die until some orientation had occurred and then the speed was increased to the desired speed.

POLYMERIZATIONS

Polymers used in the following examples were polymerized as described here. An aqueous sodium hydroxide solution was mixed with an aqueous sodium bisulfide (NaSH) solution, sodium acetate, and NMP. This mixture was heated, dehydrated, and then combined with two or more halogenated aromatics for the polymerization. All polymers were prepared with para-dichlorobenzene (p-DCB) and 1,2,4-trichlorobenzene (TCB). In some runs, part of the P-DCB was replaced with other monomers to study the effect of various comonomers. Polymers 5, 6, and 7 were prepared with 4,4'-dibromobiphenyl (6 mole percent of the total p-DCB and 4,4'-dibromobiphenyl charge). Polymers 8, 9, and 10 were prepared with meta-dichlorobenzene (m-DCB) (8 mole percent of the m-DCB and p-DCB charge). A sufficient amount of the m-DCB/P-DCB monomer mixture was used to give the indicated m-DCB monomer content. Each polymerization mixture was heated to about 230° C. and held for about two hours and then heated to about 265° C. and held for about three hours.

At the end of the polymerization time for polymer 1, the polymerization mixture was concentrated by partial solvent flashing at about 265° C. The concentrated PPS slurry was further flashed at about 240° C., washed with ambient temperature water, and filtered. After the polymer had been slurried with hot (190° C.) water and filtered, it was dried to yield polymer 1.

At the end of the polymerization time for the other polymers 2-10, deionized water was added to the reactor and the contents were cooled to about 100° C. and filtered. Polymers 2-10 were slurried with ambient deionized water, filtered, slurried twice with hot (175° C.) deionized water, and dried.

EXAMPLE I

This example illustrates the difficulties in producing die extruded PPS pipe using polymers outside the scope of the present invention. Four PPS samples were prepared using only p-DCB and TCB as halogenated aromatics. The TCB levels, expressed as a mole percent of the p-DCB, are shown in Table 1 with the polymer melt flow (MF) values.

TABLE 1

PPS POLYMERS

| Polymer | TCB, mole % | MF, g/10 min |
|---|---|---|
| 1 | 0.22 | 50 |
| 2 | 0.275 | 21 |
| 3 | 0.275 | 28 |
| 4 | 0.20 | 44 |

The four polymers were pelletized using melt temperatures of about 300°-330° C. and 325 mesh screens for Polymers 1 and 4, a 200 mesh screen for Polymer 3, and no screens for Polymer 2. The pellets were dried at 125°-150° C. for several hours and extruded into pipe using a 38 mm diameter Davis-Standard extruder equipped with a pipe die. The 33 mm outside diameter pipe was extruded using internal air pressure (14-22 psig) and a plug in the pipe open end. A water spray from around the die opening was used for cooling pipe from Polymers 1 and 2. A water bath was added for pipe from polymers 3 and 4 to improve pipe cooling. The pipe samples are described in Table 2.

Polymer 1 was extruded at a die temperature of about 305° C. and a takeoff rate of about 580 mm/min to produce pipe with a wall thickness of about 3 mm. A similar pipe produced later under similar conditions had a density of 1.360 g/cc and a density of 1.366 g/cc after annealing at 200° C. for 15 minutes. The relatively small change in density on annealing and the original opaque pipe appearance indicate that the extruded pipe was already largely crystalline. The pipe burst strength was high. Attempts to orient the pipe from Polymer 1 by subsequent die extrusion were unsuccessful.

TABLE 2

PPS Pipe

| Polymer | Pellet MF, g/10 min | Pipe Wall Thickness, mm | Density, g/cc | Burst, psig |
|---|---|---|---|---|
| 1 | 50 | 3 | 1.360[a] | 1700[a] |
| 2 | ND[b] | .1 | 1.327 | ND[b] |
| 3 | 28 | 3.9 | 1.346 | >1500[c] |
| 4 | ND[b] | 3 | 1.336 | >1500[c] |

[a] Determined on similar pipe samples made at a later time.
[b] Not Determined.
[c] Sample did not break at the indicated pressure.

Polymer 2 was extruded into pipe with a takeoff speed of about 152 cm/min to produce pipe with a wall thickness of about 1 mm and a density of 1.327 g/cc. The density, transparency, and flexibility of the pipe indicate an essentially amorphous pipe. This pipe could be easily die extruded at temperatures of about 86°-90°

C. and rates up to about 40 cm/min. However, the die extruded pipe wall thickness was only about 0.2–0.4 mm at longitudinal draw ratios of up to about 1.8× and transverse draw ratios of up to about 2.1×.

Pipe extrusions from Polymers 3 and 4 were carried out using a water bath about 152 cm long containing cool (about 24° C.) water. The hot pipe was extruded directly from the pipe die into the water bath. Pipe from Polymer 3 was extruded using a takeoff speed of 47 cm/minute and had a density of 1.346 g/cc (Table 2) and wall thickness of 3.9 mm. Polymer 4 was extruded with a takeoff speed of 58 cm/min into pipe with a wall thickness of 3 mm and a density of 1.336 g/cc. From their densities and opaque appearances, these pipe samples were appreciably crystalline and would not be suitable for die extrusion.

The results in this example show that pipe extruded from normal PPS crystallizes rapidly when the pipe wall thickness is relatively thick (about 3–4 mm thick). Thin-walled pipe (about 1 mm thick) can be quenched to the essentially amorphous state and then die extruded. However, the thin, starting wall thickness limits the thickness of the die extruded product. In addition, orientation from the rapid takeoff during pipe extrusion limits the amount of draw possible during die extrusion.

EXAMPLE II

This example demonstrates the preparation in accordance with the invention of die extruded pipe from copolymers designated as Polymers 5, 6, and 7. Polymers 5, 6, and 7 were polymerized as described above using 6 mole percent 4,4'-dibromobiphenyl (based on the p-DCB and 4,4'-dibromobiphenyl charge) and the amount of 1,2,4-trichlorobenzene shown in Table 3. The polymer melt flows ranged from 3 to 71 g/10 minutes. Compared with DSC values for a PPS similar to Polymer 1 of 94° C. for the Tg and 273° C. for the Tm, the DSC results shown in Table 3 for Polymers 5, 6, and 7 indicate higher Tg values and lower Tm values for these copolymers.

TABLE 3

Phenylene Sulfide/Biphenylene Sulfide Copolymers

| Polymer | TCB,[a] mole % | MF, g/10 min | Tg, °C. | Tm, °C. |
| --- | --- | --- | --- | --- |
| 5 | 0.4 | 3 | 101 | 251 |
| 6 | 0.4 | 28 | 97 | 261 |
| 7 | 0.2 | 71 | 97 | 255 |

[a]Mole % of the p-DCB and 4,4'-dibromobiphenyl charge.

Polymers 6 and 7 were pelletized on a 38 mm diameter single screw extruder using a 200 mesh screen in the breaker plate and a die temperature of 316° C. Pellets from Polymers 6 and 7 were dried at 150° C. for two hours and extruded into pipe using the extruder and pipe die described in Example I along with the pipe quench bath. Polymer 6 was extruded into pipe with a die temperature of 313° C. and 13 psig internal air pressure. Polymer 7 was extruded into pipe with a die temperature of 293° C. and 16 psig internal air pressure. In both extrusions a pipe pulloff rate of 58 cm/min. was used and a pipe wall thickness of about 3 mm was obtained.

The pipe products from Polymers 6 and 7 are described in Table IV. Pipe from Polymer 7, based on the low density and clear cross-section, was essentially amorphous. Pipe from Polymer 6 had a slightly higher density than pipe from Polymer 7 and had indications of a crystalline region in the center of the pipe cross-section. Apparently, during the extrusion of the pipe from Polymer 6, the bath temperature increased to allow traces of crystallization to occur in the center of the pipe wall from slower cooling. Annealed pipe from Polymer 7 had a slightly decreased burst strength compared with the as-extruded pipe.

TABLE 4

Phenylene Sulfide/Biphenylene Sulfide Copolymer Pipe

| | Pellet | Pipe | | |
| --- | --- | --- | --- | --- |
| Polymer | MF, g/10 min | Annealed | Density, g/cc | Burst, psig |
| 6 | 27 | no | 1.328 | >1400[a] |
|   |    | yes | 1.350 | >1200[a] |
| 7 | 53 | no | 1.314 | >1400[a] |
|   |    | yes | 1.348 | 1075 |

[a]Samples did not break at the indicated pressure.

Polymer 7 pipe was die extruded using the extruder and pipe die described in Example I at die temperatures of 86°–110° C. and takeoff rates between 0.5 and 42 cm/min. Longitudinal or machine direction draw ratios as high as 6.3× and hoop or transverse draw ratio up to about 2.4× were obtained. Test results on several of the die extruded pipe samples of Polymer 7 are shown in Table 5. A variety of physical properties were obtained depending on the drawing conditions. The die extruded samples had densities of 1.316–1.317 g/cc, indicating that no significant amount of crystallization occurred during the die extrusion process.

TABLE 5

Pipe Die Extrusion for Polymer 7

| Die Temp., °C. | Draw Speed, mm/min | Draw Ratio | | Wall Thickness, mm | | Tensile Strength MPa | |
| --- | --- | --- | --- | --- | --- | --- | --- |
| | | Hoop Dir. | Longit. Dir. | Hoop Dir. | Longit. Dir. | Hoop Dir. | Longit. Dir. |
| 105 | 5 | 2.41 | 2.04 | 0.7–0.8 | 0.9–1.0 | 81 | 71 |
| 103 | 5 | 2.40 | 2.86 | 0.6–0.7 | 0.65–0.7 | 60 | 68 |
| 110 | 18 | 2.39 | 6.30 | 0.3–0.3 | 0.3–0.5 | 48 | 103 |

The results in this example show that pipe extruded from PS/BPS copolymers can be quenched to an essentially amorphous state, even when the pipe wall thickness is relatively thick (about 3–4 mm thick). These resulting essentially amorphous pipes can then be drawn to give tough biaxially drawn pipe with reasonably balanced properties in the machine and hoop directions.

EXAMPLE III

This example illustrates another copolymer made with meta-dichlorobenzene (meta-DCB) and para-dichlorobenzene (para-DCB). These copolymers are outside the scope of the present invention and are not suitable for extrusion into relatively thick, amorphous pipe that can be die extruded.

Three copolymers, Polymers 8, 9 and 10, were prepared using 8 mole percent meta-DCB, based on the total m-DCB plus p-DCB charge, and the level of 1,2,4-trichlorobenzene shown in Table 6. The melt flow values for Polymers 8, 9, and 10 ranged from 17 to 84 g/10 min. The DSC Tg and Tm values (Table 6) for polymers 8, 9, and 10 are lower than for a PPS similar to Polymer 1 (94° C. for Tg and 273° C. for Tm).

TABLE 6

| | Meta-DCB/Para-DCB Copolymers | | | |
|---|---|---|---|---|
| Polymer | TCB,[a] mole % | MF, g/10 min | Tg, °C. | Tm, °C. |
| 8 | 0.5 | 17 | 82 | 232 |
| 9 | 0.4 | 34 | 84 | 231 |
| 10 | 0.4 | 84 | 81 | 234 |

[a] Mole % of m-DCB and p-DCB charge.

Polymers 8, 9, and 10 were pelletized on a 38 mm diameter single screw extruder using a 200 mesh screen in the breaker plate and die temperatures of 320°, 316°, and 304° C., respectively. Pellets from Polymers 8, 9, and 10 were dried at 150° C. for two hours and extruded into pipe using the extruder and pipe die described in Example I along with the pipe water bath. Pipe was extruded from Polymers 8, 9, and 10 using 16 psig internal air pressure and die temperatures of 310°, 299°, and 304° C., respectively. In all extrusions, a takeoff rate of 58 cm/min. was used and a pipe wall thickness of about 3 mm was obtained.

The pipe products from Polymers 8, 9, and 10 are described in Table 7. Although the pipe samples as extruded have nearly the same density (1.329–1.331 g/cc), pipe from Polymer 8 had indications of crystallinity in the center of the pipe wall, whereas the other two pipe samples from Polymers 9 and 10 had clear cross-sections. Annealed samples of the pipe from Polymers 8, 9 and 10 had about the same density (1.361–1.362 g/cc) and exhibited lower burst strengths than the original pipe samples from Polymers 8, 9 and 10.

TABLE 7

| | Meta-DCB/Para-DCB Copolymer Pipe | | | |
|---|---|---|---|---|
| | Pellet | Pipe | | |
| Polymer | MF, g/10 min | Annealed[a] | Density, g/cc | Burst, psig |
| 8 | 12.5 | no | 1.331 | >1400[b] |
| | | yes | 1.361 | 880 |
| 9 | 28 | no | 1.329 | >1400[b] |
| | | yes | 1.361 | 920 |
| 10 | 56 | no | 1.329 | >1400[b] |
| | | yes | 1.362 | — |

[a] Annealed at 200° C. for 15 minutes for density and 30 minutes for the burst test.
[b] Samples did not break at the indicated pressure.

Attempts to die extrude the pipe products of this example were unsuccessful due to pipe splitting in the machine direction.

The results in this example show that copolymers made with meta-DCB and para-DCB can be die extruded to form pipe with clear cross-sections. This resulting pipe, however, cannot be oriented by subsequent die extrusion without longitudinal splitting of the pipe.

The results in the foregoing examples show that pipe extruded from PS/BPS copolymers can be quenched to an essentially amorphous state then oriented by subsequent die extrusion, even when the pipe wall thickness is relatively thick (about 3–4 mm thick). Pipe extruded from other PS polymers and copolymers cannot be oriented by subsequent die extrusion unless the wall thickness of the pipe is relatively thin (about 1 mm thick).

From the foregoing examples and data it will be seen that phenylene sulfide/biphenylene sulfide copolymers are suitable for the production of extruded pipe which is non-brittle and is more flexible and ductile than pipe extruded from other arylene sulfide homopolymers and copolymers.

That which is claimed is:

1. A method of producing pipe which comprises:
   (a) preparing a copolymer of phenylene sulfide and biphenylene sulfide;
   (b) forming said copolymer into essentially amorphous pipe by extrusion followed by rapid and uniform quench to avoid pipe crystallization; and
   (c) drawing said essentially amorphous pipe uniaxially by subsequent die extrusion.

2. A method in accordance with claim 1, wherein said subsequent extrusion is performed by extrusion means capable of drawing said amorphous pipe longitudinally at a longitudinal draw ratio and expanding said amorphous pipe transversely at a transverse draw ratio at elevated temperatures to give biaxial orientation.

3. A method in accordance with claim 2, wherein extrusion means is operated at temperatures in the range of from about 80° C. to about 115° C.

4. A method in accordance with claim 2, wherein extrusion means is operated at temperatures in the range of from about 85° C. to about 110° C.

5. A method in accordance with claim 2, wherein said subsequent die extrusion is performed with a pipe pull-off rate in the range of from about 0.1 cm/minute to about 100 cm/minute.

6. A method in accordance with claim 2, wherein said subsequent die extrusion is performed with a pipe pull-off rate in the range of from about 0.5 cm/minute to about 50 cm/minute.

7. A method in accordance with claim 2, wherein the axial draw ratio of said subsequent die extrusion is in the range of from about 1.5× to about 8×.

8. A method in accordance with claim 2, wherein the longitudinal draw ratio of said subsequent die extrusion is in the range of from about 2× to about 7×.

9. A method in accordance with claim 2, wherein the transverse draw ratio of said subsequent die extrusion is in the range of from about 1.5× to about 4×.

10. A method in accordance with claim 2, wherein the transverse draw ratio of said subsequent die extrusion is in the range of from about 2× to about 3×.

11. A method of producing pipe which comprises:
   a) pelletizing a phenylene sulfide/biphenylene sulfide copolymer by first extrusion means operated at temperatures in the range of from about 300° C. to about 320° C.;
   b) drying the thus pelletized copolymer;
   c) forming the thus dried, pelletized copolymer into essentially amorphous pipe by second extrusion means operated at temperatures in the range of from about 300° C. to about 310° C. followed by rapid and uniform quench to avoid pipe crystallization; and
   d) orienting the thus formed essentially amorphous pipe by subsequent die extrusion by third extrusion means operated at temperatures in the range of from about 85° C. to about 110° C., wherein the subsequent extrusion is performed with a pipe pull-off rate in the range of from about 0.5 cm/minute to about 50 cm/minute with a longitudinal draw ratio in the range of about 2× to about 7× and a transverse draw ratio in the range of about 2× to about 3×.

12. A method comprising melt extruding a phenylene sulfide/biphenylene sulfide copolymer to form a pipe and cooling the thus-extruded pipe at a rate sufficient to quench said copolymer forming said pipe to provide an essentially amorphous pipe and heating said pipe to a temperature of about the glass transition temperature or above the glass transition temperature of said copolymer and mechanically stretching said pipe.

13. A method in accordance with claim 12, wherein said pipe is stretched longitudinally.

14. A method in accordance with claim 12, wherein said pipe is stretched transversely.

15. A method in accordance with claim 12, wherein said pipe is stretched longitudinally and transversely to give biaxial molecular orientation.

16. A method in accordance with claim 12, wherein said melt extruding is performed at temperatures in the range of from about 300° C. to about 310° C.

17. A method in accordance with claim 12, wherein said thermally mechanically stretching of said pipe is performed at temperatures in the range of from about 85° C. to about 110° C.

18. A method in accordance with claim 15, wherein said pipe is stretched longitudinally with a longitudinal draw ratio in the range of from about 2× to about 7×.

19. A method in accordance with claim 15, wherein said pipe is stretched transversely with a transverse draw ratio in the range of from about 2× to about 3×.

* * * * *